V. CRÉMIEU.
METHOD OF COOLING LIQUIDS AND CHARGING THE SAME WITH GAS BY THE USE OF SNOW LIKE CARBONIC ANHYDRIDE.
APPLICATION FILED NOV. 11, 1920.

1,421,176.

Patented June 27, 1922.

INVENTOR
VICTOR CRÉMIEU
BY Munn & Co.
ATTORNEYS

UNITED STATES PATENT OFFICE.

VICTOR CRÉMIEU, OF PARIS, FRANCE.

METHOD OF COOLING LIQUIDS AND CHARGING THE SAME WITH GAS BY THE USE OF SNOWLIKE CARBONIC ANHYDRIDE.

1,421,176. Specification of Letters Patent. Patented June 27, 1922.

Application filed November 11, 1920. Serial No. 423,440.

*To all whom it may concern:*

Be it known that I, VICTOR CRÉMIEU, a citizen of the Republic of France, and residing at Paris, Seine Department, No. 54 Faubourg Saint-Honoré, in the Republic of France, have invented certain new and useful Improvements in Methods of Cooling Liquids and Charging the Same with Gas by the Use of Snowlike Carbonic Anhydride (for which I have filed applications in France, Oct. 22 and Nov. 28, 1919), of which the following is a specification.

This invention relates to a method for simultaneously cooling and charging any suitable liquid with gas, and more particularly a drink. The method consists in principle in maintaining within said liquid and in contact therewith a suitable quantity of snow-like carbonic anhydride until the liquid is properly cooled and charged with gas. This invention also relates to an apparatus permitting the maintenance in said liquid of the proper amount of snow-like carbonic anhydride used for cooling and for charging with gas.

A device of this nature consists for instance of a perforated bell-shaped member provided with a handle whereby said member may be inserted into the mass of snow-like carbonic anhydride for the purpose of filling the same with this substance.

This invention consists in forming around the mass of snow-like substance to be placed in the liquid a film of ice whereby the disengagement of gas is prevented from taking place in a turbulent manner and at an unduly rapid rate.

The entire device consisting of a perforated bell-shaped or like member, snow-like carbonic anhydride disposed therein and an outer film of ice, thus constitutes a new product which may be employed in a practical, convenient and advantageous manner, and especially for the preparation of cold and sparkling drinks.

When melting, the snow-like carbonic anhydride absorbs a quantity of heat resulting in a frigorific action which is substantially double the effect produced by an equal weight of ice, and if thereof a mass of such snow-like substance is maintained at the bottom of a glass of water, for instance, carbonic acid will be produced for charging the water, together with a considerable cooling effect.

For instance eight grammes of said snow-like substance will introduce into water 1200 frigories and 4 liters of gas, which is sufficient for the charging of an average sized glass of water and for lowering the temperature to 4° centigrade.

The accompanying drawing shows by way of example a constructional form of a device according to this invention.

Figure 1:
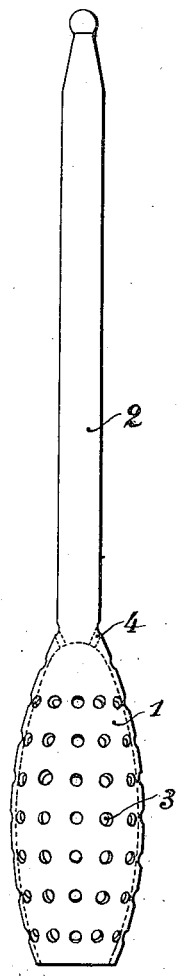
Fig. 1 is an elevation of the first constructional form.

This device consists of a small bell-shaped member 1 (Fig. 1) provided with a handle 2 and having therein the small apertures or narrow slots 3 in considerable number, through which the carbonic acid gas is given off as the snow-like substance melts, the device being more particularly adapted for the cooling of drinks. But it has been remarked that in spite of the precautions which may be taken and the form adopted, the gas is given off in a turbulent manner and in large bubbles, whence it results that the liquid is imperfectly charged with gas. On the other hand, when the fusion of the snow-like block is already in the advanced stage, small particles of the substance become detached from the mass and float upon the surface, thus causing an inconvenience.

Experience proves that such inconveniences may be obviated by covering the bell-shaped member filled with snow-like substance with a film of ice. For this purpose it will suffice to immerse said bell-shaped member in a liquid which has been previously cooled to a point near its temperature of solidification. In this case the solidification will take place around the walls of the bell-shaped member which thus becomes covered with a uniform layer of ice through which the gas is now given off only in the shape of fine bubbles. If the bell-shaped member is allowed to remain for a sufficient length of time in the previously cooled liquid, the regulating layer of ice may reach several millimeters thickness.

A bell-shaped member thus prepared which is placed in a glass containing a drink will exert a double action by charging the liquid with gas and by cooling the same. It is of course understood that said bell-shaped members may be constructed in any suitable manner and may be given the most varied forms.

In the preferred construction, the bell-shaped members and the handle thereof may be manufactured by the lathe turning process from a piece of light wood, thus obtaining a very inexpensive device, and each consumer may destroy the bell-shaped member after use in the same manner as for a piece of straw employed for drinking purpose.

The dimensions of the device are calculated in such manner that said member is filled with the snow-like substance by introducing it with the open end down into a vessel filled with said substance and exerting a slight pressure by hand, whereby the member is caused to contain the required amount of the substance, for instance about eight grammes for a glass of drink. One or more apertures 4 are preferably provided at the top of the bell shaped member to provide for the escape of gas in the event of an excess of pressure caused by the resistance which the outer covering affords to the disengagement of carbonic acid gas, and to obviate the breakage of the bell shaped member under the effect of an excessive internal pressure.

A considerable number of such devices covered with ice by the hereinbefore described method may be prepared in advance and preserved in heat protecting receptacles such as Dewar vessels for the space of several days, and they will afford a substitute for a soda water supply bottle and for ice.

Figure 2:
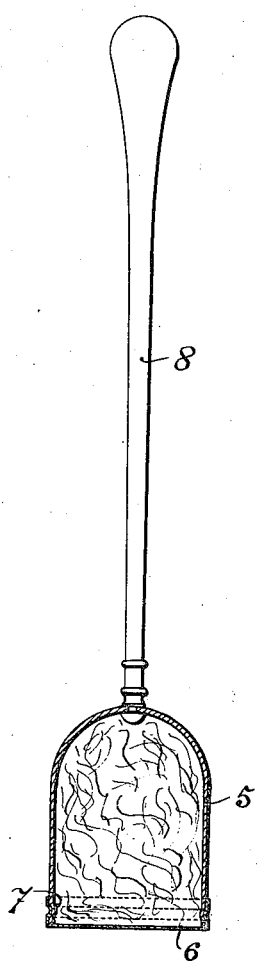
Fig. 2 shows the second constructional form partly in elevation and partly in section.

According to the second constructional form (Fig. 2) the apparatus consists of a metallic bell-shaped member provided with a handle. The bell 5 is made of stamped metal, and is closed by a cover 6 made of thin stamped metal, the rim of which is set in a bezel and engages a circular groove 7 provided above the edge of the bell. The handle 8 may be fixed at the top of the bell in a suitable manner.

When the apparatus, filled with carbonic anhydride, is immersed in a liquid, the gas set free by evaporation of the carbonic anhydride escapes in form of fine bubbles through the circular interstices which remains between the cover and the edge of the bell.

It is of course understood that the use of such devices is not limited to their application to drinks, and by suitably varying the size and shape of the bell-shaped members, these latter may be made the subject of industrial applications in the preparation of alimentary products.

Claims—
1. A method for simultaneously cooling and charging a liquid with gas, consisting in maintaining within said liquid and in contact therewith a suitable quantity of snow-like carbonic anhydride.
2. In a method for simultaneously cooling and charging liquids with gas, the immersion of a measured quantity of snow-like carbonic anhydride in those liquids previously brought to a temperature near the point of solidification thereof, said immersion having for its object the formation of a film of ice surrounding said quantity of snow-like substance whereby the disengagement of carbonic acid gas shall be moderated.

In testimony that I claim the foregoing as my invention I have signed my name in presence of a subscribing witness.

VICTOR CRÉMIEU.

Witness:
MAURICE ROWE.